United States Patent
Bergmann

(10) Patent No.: US 11,465,676 B2
(45) Date of Patent: Oct. 11, 2022

(54) ALL-WHEEL STEERING SYSTEM FOR A MOTOR VEHICLE, MOTOR VEHICLE, AND METHOD OF OPERATING AN ALL-WHEEL STEERING SYSTEM

(71) Applicant: TRW Automotive GmbH, Alfdorf (DE)

(72) Inventor: Philipp Bergmann, Dusseldorf (DE)

(73) Assignee: ZF Automotive Germany GmbH, Alfdorf (DE)

( * ) Notice: Subject to any disclaimer, the term of this patent is extended or adjusted under 35 U.S.C. 154(b) by 331 days.

(21) Appl. No.: 16/211,657

(22) Filed: Dec. 6, 2018

(65) Prior Publication Data

US 2019/0176879 A1    Jun. 13, 2019

(51) Int. Cl.
*B62D 6/00* (2006.01)
*B62D 7/15* (2006.01)
*B62D 5/00* (2006.01)

(52) U.S. Cl.
CPC ............... *B62D 6/00* (2013.01); *B62D 5/008* (2013.01); *B62D 6/002* (2013.01); *B62D 7/159* (2013.01); *B62D 7/1581* (2013.01)

(58) Field of Classification Search
CPC .......... B62D 6/00; B62D 6/002; B62D 7/159; B62D 7/1581; B62D 5/008
See application file for complete search history.

(56) References Cited

U.S. PATENT DOCUMENTS

| | | | | |
|---|---|---|---|---|
| 2008/0119988 A1* | 5/2008 | Yasui | ...................... | B62D 7/159 701/41 |
| 2009/0021396 A1* | 1/2009 | Hedderich | ......... | B62D 15/0295 340/937 |
| 2016/0046321 A1* | 2/2016 | Takashima | ............. | B62D 6/002 701/41 |
| 2016/0052547 A1* | 2/2016 | Kashiwai | ............ | B60W 40/076 701/41 |

FOREIGN PATENT DOCUMENTS

| | | |
|---|---|---|
| DE | 102007000650 A1 | 5/2008 |
| DE | 112013006873 T5 | 12/2015 |
| EP | 1705102 A1 | 9/2006 |

* cited by examiner

*Primary Examiner* — Rachid Bendidi
(74) *Attorney, Agent, or Firm* — Robert James Harwood

(57) ABSTRACT

An all-wheel steering system for a motor vehicle is described which has an active front axle steering system and an active rear axle steering system. The front axle steering system includes a gear ratio unit which is coupled to a steering wheel. The gear ratio unit is configured to define a front axle steering angle as a function of a steering wheel angle and a front axle steering ratio. In addition, the gear ratio unit is coupled to the rear axle steering system in such a way that the front axle steering ratio is adjustable as a function of a rear axle steering angle. Further, a motor vehicle having such an all-wheel steering system is discussed. Also presented is a method of operating an all-wheel steering system for a motor vehicle.

4 Claims, 1 Drawing Sheet

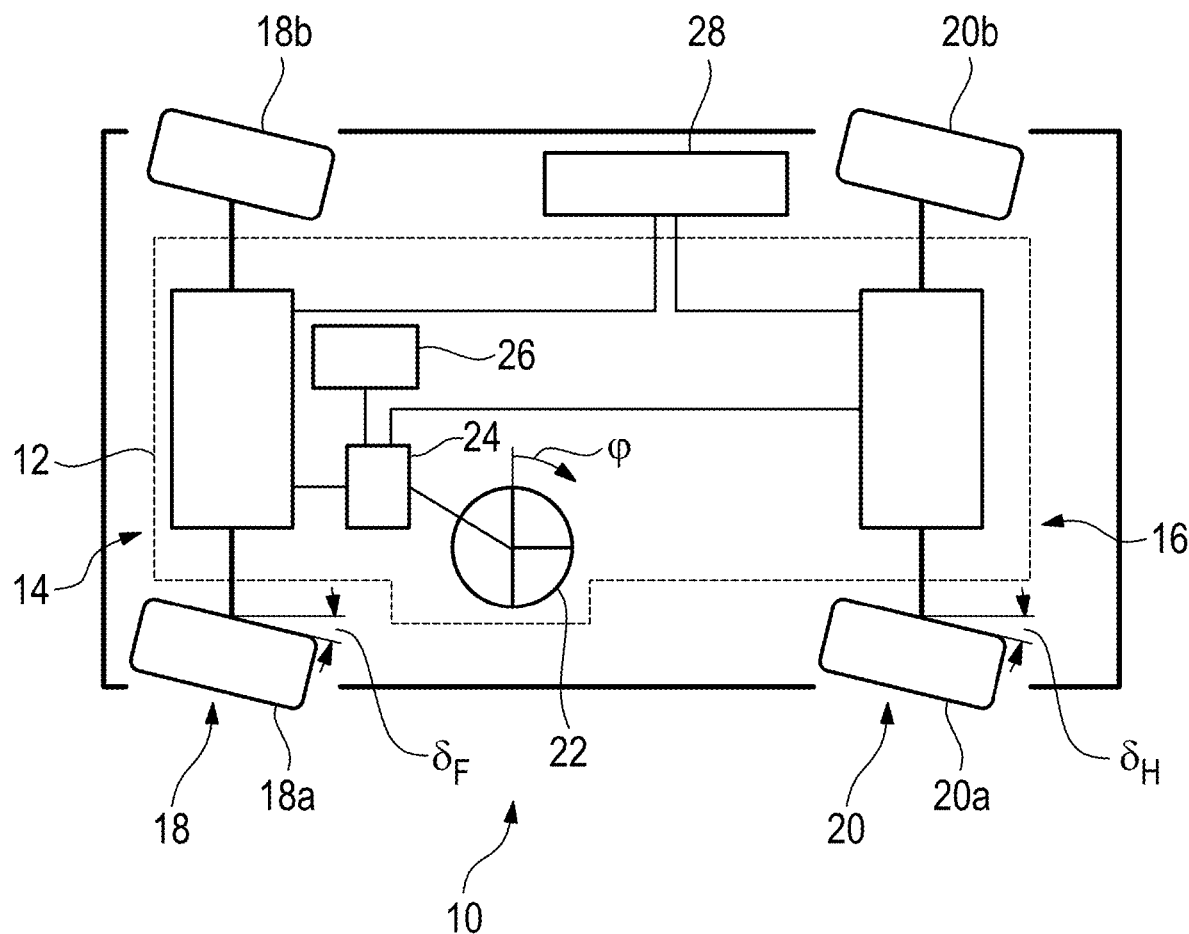

ALL-WHEEL STEERING SYSTEM FOR A MOTOR VEHICLE, MOTOR VEHICLE, AND METHOD OF OPERATING AN ALL-WHEEL STEERING SYSTEM

CROSS-REFERENCE TO RELATED APPLICATIONS

This application claims priority to German Patent Application No. 10 2017 129 322.1, filed 8 Dec. 2017, the disclosures of which are incorporated herein by reference in entirety.

BACKGROUND TO THE INVENTION

The present invention relates to an all-wheel steering system for a motor vehicle, including an active front axle steering system and an active rear axle steering system, the front axle steering system including a gear ratio unit which is coupled to a steering wheel, and the gear ratio unit being configured to define a front axle steering angle as a function of a steering wheel angle and a front axle steering ratio.

In addition, the present invention relates to a motor vehicle including such an all-wheel steering system.

The present invention further relates to a method of operating an all-wheel steering system for a motor vehicle.

All-wheel steering systems of the type mentioned at the outset and associated motor vehicles are known from the prior art. For example, EP 1 705 102 A1 shows such an all-wheel steering system.

In this context, an active steering system is understood to mean a steering system in which a steering intervention at the associated steered axle is possible even independently of the steering wheel angle. In other words, the axle steering angle can be selected irrespective of the steering wheel angle.

If such active steering systems are active front axle steering systems, they are usually designed as steer-by-wire steering systems or comprise a superposition transmission, which may be, for example, a planetary transmission or a Harmonic Drive transmission.

The front axle steering ratio, which is realized by means of the gear ratio unit, is defined as the ratio of the steering wheel angle to the front axle steering angle. In this context, it is known to adjust the front axle steering ratio as a function of a vehicle speed, so that a small front axle steering ratio is kept ready at low vehicle speeds and a correspondingly larger one at high vehicle speeds.

The result is that a particular steering wheel angle leads to a larger axle steering angle at low vehicle speeds than at high vehicle speeds.

Active rear axle steering systems are generally configured as steer-by-wire steering systems.

The rear axle steering system usually operates in the opposite direction to the front axle steering system up to a limit speed of the motor vehicle here, which is in the region of 50 km/h, for example. This makes the motor vehicle especially maneuverable, which means it has a particularly small turning circle.

When the axles steer in opposite directions, the vehicle orientation changes along a roadway. This is also referred to as cornering.

Above the limit speed, the rear axle steering system and the front axle steering system then operate equidirectionally. The result is that the motor vehicle can move slightly obliquely to the side. No change in the vehicle orientation takes place here if a front axle steering angle and a rear axle steering angle are substantially the same. Otherwise, the vehicle orientation changes to a comparatively small extent. Such a transverse movement of the motor vehicle is also referred to as displacement of the vehicle. Thus, only the lateral position along the roadway is changed. In practice, a lane change can be effected in this way, for example.

In this connection, the rear axle steering system serves to increase the vehicle stability. Since turning in the rear wheels reduces the yaw tendency or yaw rate of the vehicle, this is often referred to as yaw rate damping.

In known rear axle steering systems, the open-loop or closed-loop control of the rear axle steering angle may be performed by means of a so-called steering proportion, which is defined as the proportion of the rear axle steering angle to the front axle steering angle and is usually expressed as a percentage. The steering proportion is usually dependent on the vehicle speed and is stored as a function or look-up table in a control unit of the steering system. This means that in the operating mode involving opposite directions, the proportion is negative; in the operating mode involving the same direction, it is positive. The values of the steering proportion are in the range of from −30% to +20%, for example.

As an alternative, it is possible to set the rear axle steering angle without a direct dependence on the front axle steering angle. In doing so, the vehicle speed, steering wheel angle, lateral acceleration values, sideslip angle and/or yaw rate, for example, are used as input variables. On the basis of these, a rear axle steering angle is then ascertained by means of a known method. Such a setting of the rear axle steering angle may be carried out across all vehicle speeds or only in selected vehicle speed ranges.

When defining the rear axle steering angle directly or when defining the rear axle steering angle using a steering proportion, that is, for both types of all-wheel steering systems, a trade-off must always be found between vehicle stability, in particular yaw rate damping, and steering effort for the driver. In the interests of vehicle stability or maximum yaw rate damping, the rear axle steering angle has to be as large as possible. This, however, results in a particularly high steering effort for the driver, which is reflected in the angle by which the steering wheel has to be rotated if the driver wishes to take a bend also at high speeds, that is, to change the orientation of the vehicle. This runs counter to the endeavor to keep the steering effort for the driver low.

SUMMARY OF THE INVENTION

It is therefore a feature of the present invention to resolve this trade-off and to provide an all-wheel steering system by means of which a high vehicle stability, in particular an effective yaw rate damping, and at the same time a comparatively low steering effort for the driver can be ensured.

The present invention provides an all-wheel steering system of the type mentioned at the outset, in which the gear ratio unit is coupled to the rear axle steering system in such a way that the front axle steering ratio is adjustable as a function of a rear axle steering angle. Thus, when the front axle steering ratio is defined, the actually current or demanded rear axle steering angle is taken into account. In particular, in the case of a large actual or demanded rear axle steering angle, a small front axle steering ratio is set, which has the effect that a comparatively small steering wheel angle results in a comparatively large front axle steering angle. As a result, in the interests of high vehicle stability and effective yaw rate damping, the rear axle steering angle can be selected as large as possible in line with a given situation. The driver's steering effort does not have to be taken into consideration here, as the steering effort can be kept low by setting the front axle steering ratio in combination with any desired rear axle steering angles. This allows the driver to perform cornering with little steering effort, i.e. with small steering wheel angles, with a particularly high degree of vehicle stability being ensured at the same time. This applies in particular at high speeds when the rear axle steering system and the front axle steering system operate equidirectionally. As a result, in this system the rear axle steering angle can be approx. 40% to 90% of the front axle steering angle.

For establishing the rear axle steering angle, methods known from the prior art may be made use of. More particularly, the rear axle steering angle may be set here without a direct dependence on the front axle steering angle.

In one embodiment, the all-wheel steering system comprises a bend detection unit which is coupled to the gear ratio unit in such a way that the front axle steering ratio is adjustable as a function of a signal of the bend detection unit, in particular wherein the front axle steering ratio decreases when a bend is detected. In this context, a bend detection unit is understood to mean a system that detects if and when the driver of the motor vehicle wishes to take a bend or make a turn. Such a bend detection unit may operate either in parallel in terms of time, i.e. it recognizes the driver's wish to corner when he/she starts cornering, or in an anticipating fashion in terms of time. In that case, it recognizes the driver's wish to corner even before the driver actually starts cornering. In both alternatives, the front axle steering ratio preferably is reduced, i.e. a given steering wheel angle allows a particularly high front axle steering angle to be achieved. Therefore, the driver has to provide only a small steering wheel angle in order to take a bend. In other words, the steering effort for the driver is reduced.

In the interests of driving comfort, it may also be appropriate to reduce the rear axle steering angle.

In this connection, the bend detection unit may be adapted to process angular positions of the steering wheel. This means that a cornering is detected when the steering wheel assumes a specific angular position which, for example, deviates from the straight ahead position by a predefined angle. Alternatively or additionally, a gradient of the angular position, that is, a change in angle of the steering wheel, can be evaluated. In this way, a particularly simple and reliable bend detection is ensured.

Alternatively or additionally, the bend detection unit may be adapted to process path information, in particular wherein at least one of a prediction system and a vehicle-side camera is provided which supplies such path information. The prediction system may comprise a navigation system, for example, in which the course of roads and routes (map data) is stored so that, in cooperation with the current location of the vehicle and its direction of travel, it can be anticipated in terms of time that the vehicle approaches a bend.

Alternatively or additionally, path information may also be provided by vehicle-side cameras, which, for example, are part of a lane departure warning system or a lane keeping assist system. The camera images may be evaluated in an automated manner here, so that a cornering can be anticipated in this way as well. In this connection, for example, the course of a road edge line or a road center marking can be evaluated. Generally, this makes it possible to set the front axle steering ratio even before cornering or right at the start of cornering such that the steering effort for the driver is low.

Advantageously, the front axle steering ratio is continuously adjustable. Thus, depending in particular on the vehicle speed and radius of curve, a front axle steering ratio can always be selected that combines high vehicle stability with low steering effort for the driver. Further, this results in a behavior of the all-wheel steering system that is comfortable for the driver and in line with expectations. This is usually perceived as pleasant by the driver.

In one variant, the all-wheel steering system comprises an interface to a driving dynamics control unit, at least one of the front axle steering angle and the rear axle steering angle being adjustable as a function of a signal output from the driving dynamics control unit, and the driving dynamics control unit changing the rear axle steering angle, and the front axle steering ratio being determined based on the changed rear axle steering angle. The paramount goal of such a driving dynamics control unit is to keep the motor vehicle stable and controllable in all situations. In other words, a high degree of vehicle stability is to be ensured. This includes, in particular, an effective yaw rate damping. To this end, the driving dynamics control system can change the front axle steering angle and/or the rear axle steering angle, without any movement of the steering wheel being required for this. In this context, the change in steering angles may be additive (including the reverse operation of subtraction) or multiplicative (including the reverse operation of division). Thus, correction values are applied to the front axle steering angle and/or the rear axle steering angle by means of an addition or multiplication, so that the desired goal of driving stability is achieved. To perform these tasks, the driving dynamics control unit can make use of methods known from the prior art. Here, the signal coming from the driving dynamics control unit can be a demanded steering angle or an actual steering angle. In steering systems which adjust the rear axle steering angle by means of a steering proportion as a function of the front axle steering angle, it may occur in this connection that the proportion of the actual and/or demanded rear axle steering angle to the actual front axle steering angle does not correspond to the steering proportion stored in the steering system.

Preferably, the active rear axle steering system is a steer-by-wire system. In particular, the active rear axle steering system therefore features no mechanical coupling to the steering wheel. This means it can be arranged in the associated motor vehicle in a relatively simple and space-saving manner. Further, a steer-by-wire system can be configured to respond particularly quickly. This is especially true in comparison to mechanical systems. A steer-by-wire system can thus be used to provide a rear axle steering system that increases vehicle stability particularly effectively.

The feature is further achieved by a motor vehicle of the type initially mentioned, which includes an all-wheel steering system according to the invention. Such a vehicle has a particularly high vehicle stability in all situations. At the same time, the steering effort for the driver of such a vehicle is always low, which means that he/she only needs to implement comparatively small steering wheel angles for cornering. In particular, in a motor vehicle having a rear axle steering, in this way steering wheel angles can be realized that correspond to those of motor vehicles without a rear axle steering even in driving situations in which the rear axle steering and the front axle steering operate equidirectionally.

In addition, the feature is achieved by a method of the type initially mentioned, the method including the steps of:
(a) defining a front axle steering angle as a function of a steering wheel angle and a variable front axle steering ratio, and (b) defining the front axle steering ratio as a function of a rear axle steering angle.

Unlike known methods, the front axle steering ratio is thus determined as a function of the current or requested rear axle steering angle. This makes it possible to resolve the conflict existing up to now between the goals of achieving high vehicle stability and low steering effort for the driver when cornering. With a view to high vehicle stability, large rear axle steering angles can, in fact, now be utilized, which can ultimately amount to 40% to 90% of the front axle steering angle. In spite of this, the steering effort remains low, since the front axle ratio is set to be correspondingly small. As a result, a driver only needs to generate a relatively small steering wheel angle to bring about a comparatively large front axle steering angle.

According to one variant, step (b) is carried out only if the front axle steering angle and the rear axle steering angle are oriented equidirectionally. The rear axle steering angles are made use of for increasing the vehicle stability only in such an operating mode, which, as a rule, is selected above a particular limit speed of the motor vehicle of, e.g., 50 km/h. Below the limit speed, the front axle steering angle and the rear axle steering angle are usually oriented in opposite directions in order to keep the turning circle of the motor vehicle as small as possible. The above-mentioned conflict of goals thus occurs in particular when the front axle steering angle and the rear axle steering angle are oriented in the same direction. As already described, this allows the steering effort in cornering to be reduced while the vehicle stability remains constant.

Step (b) may be carried out in a cornering of the motor vehicle, in particular wherein the front axle steering ratio is reduced in a cornering. In this context, a lower front axle steering ratio means that only a smaller steering wheel angle is required for a defined front axle steering angle. This reduces the steering effort for the driver, who needs to move the steering wheel to a lesser extent, which he/she usually perceives as an increase in comfort. At the same time, however, the ratio is reduced only to an extent such as to ensure that the driver feels that the vehicle is controllable at all times.

Preferably, the front axle steering ratio is defined as a function of path information. In this regard, reference is made to the above-mentioned effects and advantages.

The path information may comprise angular positions of a steering wheel.

Alternatively or additionally, path information may be provided by at least one of a prediction system and a vehicle-side camera.

In addition, at least one of the front axle steering angle and the rear axle steering angle may be adjustable for driving dynamics control, wherein the rear axle steering angle is changed and the front axle steering ratio is determined based on the changed rear axle steering angle. In this respect, reference is made to the above discussions regarding driving dynamics control.

Other advantages of this invention will become apparent to those skilled in the art from the following detailed description of the preferred embodiments, when read in light of the accompanying drawings.

BRIEF DESCRIPTION OF THE DRAWINGS

FIG. 1 schematically shows a motor vehicle according to the invention having an all-wheel steering system according to the invention, which can be operated by means of a method according to the invention.

DETAILED DESCRIPTION OF THE INVENTION

A motor vehicle 10 includes an all-wheel steering system 12.

The all-wheel steering system 12 comprises an active front axle steering system 14 and an active rear axle steering system 16, the rear axle steering system 16 being in the form of a steer-by-wire system.

Here, a front axle 18, on which the front axle steering system 14 acts, has two front wheels 18a, 18b arranged thereon, which are turned or deflected by a front axle steering angle $\delta_F$ in FIG. 1.

Similarly, a rear axle 20, on which the rear axle steering system 16 acts, has two rear wheels 20a, 20b arranged thereon, which are turned or deflected by a rear axle steering angle $\delta_H$.

In FIG. 1, the front axle steering angle $\delta_F$ and the rear axle steering angle $\delta_H$ have been drawn in so as to make them clearly visible. In comparison with reality, the size of the illustrated angles may be very much larger or smaller.

For reasons of clarity, the rear axle steering angle $\delta_H$ is illustrated as an actually present angle. However, it may just as well be an angle demanded by an associated control unit.

The front axle steering angle $\delta_F$ is adjusted using a steering wheel 22 at which a steering wheel angle $\varphi$ can be adjusted and which is coupled to a gear ratio unit 24 of the front axle steering system 14.

The front axle steering angle $\delta_F$ is thus fixed as a function of the steering wheel angle $\varphi$ and a front axle steering ratio implemented by the gear ratio unit 24.

The gear ratio unit 24 is also coupled to the rear axle steering system 16 so that the front axle steering ratio is adjustable as a function of the rear axle steering angle $\delta_H$.

The rear axle steering angle $\delta_H$ is adjusted in the interests of as high a vehicle stability as possible. In the illustrated embodiment, this is effected without a direct dependence on the front axle steering angle $\delta_F$. To this end, use is made of methods known from the prior art. As already mentioned, the rear axle steering angle $\delta_H$ may be an actual or a demanded angle here.

In the illustrated embodiment, a small front axle steering ratio is set for large rear axle steering angles $\delta_H$. As a result of this, a driver of the motor vehicle 10 can set a relatively large front axle steering angle $\delta_F$ by means of a relatively small steering wheel angle $\varphi$. In other words, the driver needs to rotate the steering wheel 22 only a little, which means that his/her steering effort is low.

In addition, a bend detection unit 26 is coupled to the gear ratio unit 24. The coupling is configured in such a way here that the front axle steering ratio is adjustable as a function of a signal of the bend detection unit 26.

For generating such a signal, the bend detection unit 26 is adapted to process angular positions of the steering wheel 22, that is, the steering wheel angle $\varphi$, and/or path information which, in the illustrated embodiment, it receives from a prediction system, which is not shown in more detail. In this way, the bend detection unit 26 detects whether a driver of the motor vehicle 10 wishes to take a bend or just starts to take a bend.

Alternatively or additionally, a vehicle-side camera, not shown in more detail, may also be used for supplying path information.

In the illustrated embodiment, in such a case the front axle steering ratio is reduced.

The result is that, in comparison to a front axle steering ratio that has not been reduced, the driver of the motor vehicle 10 only needs to set a smaller steering wheel angle φ at the steering wheel 22 in order to take the identical bend. Thus, the steering effort for the driver is low.

The front axle steering ratio is always adjusted continuously here.

Furthermore, the all-wheel steering system 12 has an interface to a driving dynamics control unit 28.

The driving dynamics control unit 28 can adjust the front axle steering angle SF and/or the rear axle steering angle $\delta_H$ by means of appropriate signals; for this purpose, it uses methods known from the prior art.

Since both the front axle steering system 14 and the rear axle steering system 16 are so-called active steering systems, this can be effected without a change in the steering wheel angle φ.

Operation of the all-wheel steering system 12 can proceed as follows.

It is assumed that the all-wheel steering system 12 is in an operating mode in which the front axle steering angle $\delta_F$ and the rear axle steering angle $\delta_H$ are oriented in the same direction. This is usually the case if the speed of the motor vehicle 10 is higher than approx. 50 km/h.

The operating mode with the front axle steering angle $\delta_F$ and the rear axle steering angle $\delta_H$ being oriented in the same direction is also illustrated in FIG. 1.

Utilizing information about the current steering wheel angle φ and by evaluating path information provided through the prediction system, not shown in more detail, or the vehicle-side camera, not shown in more detail, the bend detection unit 26 now detects that the driver of the motor vehicle 10 wishes to take a bend.

Now the currently present rear axle steering angle $\delta_H$ is acquired, which was fixed by means of a known method in the interests of a maximum possible vehicle stability, and therefore also a maximum yaw rate damping. This may have been done by means of the driving dynamics control unit 28.

Then, utilizing the rear axle steering angle $\delta_H$ and the signals of the bend detection unit 26, a front axle steering ratio is defined that is suitable for the current driving situation. In particular, for large rear axle steering angles $\delta_H$ a small front axle steering ratio is also selected here.

The front axle steering angle $\delta_F$ is then always obtained as a function of the steering wheel angle φ, which is set by the driver, and the front axle steering ratio.

This means that in the present case the driver only needs to set a relatively small steering wheel angle φ even in the case of large rear axle steering angles $\delta_H$, in order to obtain a comparatively large front axle steering angle $\delta_F$.

The driver can therefore take a relatively sharp bend without having to turn the steering wheel 22 heavily. In other words, when cornering, the steering effort for the driver is low.

In accordance with the provisions of the patent statutes, the principle and mode of operation of this invention have been explained and illustrated in its preferred embodiments. However, it must be understood that this invention may be practiced otherwise than as specifically explained.

What is claimed is:

1. A method of operating an all-wheel steering system for a motor vehicle comprising the steps of:
   (a) analyzing stored map data and/or camera image data to detect a presence of an upcoming bend in a road on which the motor vehicle is traveling,
   (b) when the presence of the upcoming bend is detected, adjusting a front axle steering ratio in the motor vehicle as a function of a rear axle steering angle and the presence of the upcoming bend prior to the motor vehicle reaching the upcoming bend, and
   (c) turning front wheels of the motor vehicle by a front axle steering angle, the front axle steering angle being a function of a steering wheel angle and the front axle steering ratio in the motor vehicle, the front axle steering ratio being a ratio of the steering wheel angle to the front axle steering angle,
   wherein the front axle steering ratio is further adjusted as a function of angular positions of a steering wheel and at least one of the front axle steering angle and the rear axle steering angle is adjustable for driving dynamics control, wherein the rear axle steering angle is changed and the front axle steering ratio is adjusted based on the changed rear axle steering angle and the presence of the upcoming bend.

2. The method according to claim 1, wherein the detected presence of the upcoming bend results in a reduction in the front axle steering ratio.

3. The method according to claim 1, wherein the stored map data is provided by a navigation system and the camera image data is provided by a vehicle-side camera.

4. The method according to claim 1, wherein the front axle steering ratio in the motor vehicle is adjusted before the front wheels of the motor vehicle are turned.

\* \* \* \* \*